(12) United States Patent
Rosa

(10) Patent No.: US 11,747,189 B1
(45) Date of Patent: Sep. 5, 2023

(54) FLOAT ASSEMBLY

(71) Applicant: Carlos Rosa, Camuy, PR (US)

(72) Inventor: Carlos Rosa, Camuy, PR (US)

(\*) Notice: Subject to any disclaimer, the term of this patent is extended or adjusted under 35 U.S.C. 154(b) by 576 days.

(21) Appl. No.: 17/013,900

(22) Filed: Sep. 8, 2020

Related U.S. Application Data

(63) Continuation-in-part of application No. 16/373,737, filed on Apr. 3, 2019, now Pat. No. 10,770,250.

(60) Provisional application No. 62/652,493, filed on Apr. 4, 2018.

(51) Int. Cl.
*G01F 23/52* (2006.01)
*G01F 23/60* (2006.01)
*G01F 23/50* (2006.01)

(52) U.S. Cl.
CPC ............ *G01F 23/523* (2013.01); *G01F 23/50* (2013.01); *G01F 23/603* (2013.01)

(58) Field of Classification Search
CPC ........ G01F 23/603; G01F 23/48; G01F 23/50; G01F 23/523
See application file for complete search history.

(56) References Cited

U.S. PATENT DOCUMENTS

| | | | | |
|---|---|---|---|---|
| 5,155,311 A | * | 10/1992 | Utke | ...................... H01H 36/02 417/40 |
| 2005/0126283 A1 | * | 6/2005 | Fling | ..................... G01F 23/543 73/305 |
| 2006/0275136 A1 | * | 12/2006 | Liu | ..................... F04D 15/0218 417/40 |

\* cited by examiner

*Primary Examiner* — Paul M. West
(74) *Attorney, Agent, or Firm* — Luis Figarella

(57) ABSTRACT

A float assembly comprising a float traveling along a rod until making contact with either an upper or a lower adjustable stopper, so that an actuator lever having one or more counterweights in mechanical coupling with a switch, so that the float assembly may respond to the fluid level.

16 Claims, 13 Drawing Sheets

FLOAT ASSEMBLY

CROSS-REFERENCE TO RELATED APPLICATIONS

This application is a Continuation in Part of U.S. Appl. "Float Assembly", Ser. No. 16/373,737, filed Apr. 3, 2019 which claims priority to U.S. Provisional patent application Ser. No. 62/652,493 titled "Float Assembly", filed on Apr. 4, 2019 the disclosure of both which is herein incorporated by reference in their entirety.

PATENTS CITED

The following documents and references are incorporated by reference in their entirety, Lindemann (U.S. Pat. No. 1,666,498), Zane (U.S. Pat. No. 3,464,437), Reeve (U.S. Pat. No. 2,791,964), Issachar (U.S. Pat. No. 6,218,949) and Griffith (U.S. Pat. No. 2,496,467).

FIELD OF THE INVENTION

The present invention relates to an apparatus and system for achieving a desired fluid level within a container, and specifically to a fluid float apparatus.

DESCRIPTION OF THE RELATED ART

Many types of liquid level sensing devices have been disclosed in the prior art. Such devices, which are usually based on magnetic, electrical conductivity, acoustic or optical parameters, enable user manipulation of the positioning of the sensing elements for either facilitating the operation of the liquid level sensor itself or the issue of a sensible output at a desired liquid level in the monitored vessel, in accordance with one or more predetermined sensing elements.

Most of the liquid level monitoring and alarm systems described in the prior art, including those based on a floating magnet, are not versatile and usually have drawbacks and/or are not convenient for user manipulation. There exists a need for a float level capable of easy access and operation.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a float operated electric switch actuating mechanism comprising an electric switch, a float having a notch along said float's outer perimeter, said notch traveling along an assistive rod, a spiral rod connected to a frame that limits the displacement of said spiral rod in a vertical dimension while allowing said rod to rotate freely around said rod's central axis in response to said float's up/down movement, with said rod having an adjustable upper and adjustable lower stopper that cause said rod to move up/down in response to said float force on said upper/lower stoppers respectively and a cross beam mechanically connected to said electric switch and to said spiral rod through a rotating mechanical component so that as the float pushes the upper/lower stopper, the resulting cross beam movement activates/deactivates said switch.

In another aspect, one or more rotational measurement components mechanically coupled to said spiral rod so as to measure said rod's rotation, while allowing said rod's up/down movement in response to said float contact with said upper/lower stoppers. In yet another aspect, said rotational measurement component is comprised by one of: an encoder, potentiometer, rheostat and/or rotation counter, and said rotational components mechanical coupling is comprised of two gears, one taller than the other by the distance by which said rod moves up/down in response to said float contact with said upper/lower stoppers. In another aspect, an assistive float. In yet another aspect, said cross beam's pivot point is mechanically linked to said frame at a first end, said cross beam makes contact with said switch at a point between said first end and said mechanical connection to said rod and said cross beam further extends to form said beam's distal end. In another aspect, said cross beam's distal end has a counterweight. In yet another aspect, said counterweight is comprised of all or parts of a ferrous material and said counterweight is sandwiched within a gap formed by two permanent magnets.

In one aspect, the invention is about a float operated electric switch actuating mechanism comprising: an electric switch, a float, a hollow rod having two rotatable screws along said rod's length, each said screw having a notch along the length of said rod's outer surface, said notch partially exposing said hollow rod's interior for a given length of rod, each said notch having a limit tab with an opening that matches the screw thread, so that rotation of said screw causes the tab to travel along said notch length, one said first tab forming an upper tab, and another said tab forming a lower tab, wherein said rod is connected to a frame that limits the displacement of said spiral rod in a vertical dimension in response to said float's contact with either said upper or a lower tab, a cross beam mechanically connected to said electric switch and to said spiral rod through a rotating mechanical component so that as the float pushes the upper/lower stopper, the resulting cross beam movement activates/deactivates said switch. In another aspect, an assistive float. In yet another aspect said cross beam's pivot point is mechanically linked to said frame at a first end, said cross beam makes contact with said switch at a point between said first end and said mechanical connection to said rod and said cross beam further extends to form said beam's distal end. In another aspect, said cross beam's distal end has a counterweight. In yet another aspect, said counterweight is comprised of all or parts of a ferrous material and said counterweight is sandwiched within a gap formed by two permanent magnets.

In one aspect, the invention is about a float actuating mechanism comprising a fluid flow actuator, a float having a notch along said float's outer perimeter, said notch traveling along an assistive rod, a spiral rod connected to a frame that limits the displacement of said spiral rod in a vertical dimension while allowing said rod to rotate freely around said rod's central axis in response to said float's up/down movement, with said rod having an adjustable upper and adjustable lower stopper that cause said rod to move up/down in response to said float force on said upper/lower stoppers respectively; and a mechanical member mechanically connected to said fluid flow actuator and to said spiral rod through a rotating mechanical component so that as the float pushes the upper/lower stopper, the resulting cross beam movement activates/deactivates said fluid flow actuator. In another aspect, one or more rotational measurement components mechanically coupled to said spiral rod so as to measure said rod's rotation, while allowing said rod's up/down movement in response to said float contact with said upper/lower stoppers. In yet another aspect, said rotational measurement component is comprised of at least one of: an encoder, potentiometer, rheostat and/or rotation counter, said rotational components mechanical coupling is comprised of two gears, one taller than the other by the distance by which said rod moves up/down in response to said float contact with said upper/lower stoppers, and said fluid flow actuator is comprised of at least one of: fluid valve and/or electrical switch. In another aspect, an assistive float.

In one aspect, the invention is about a method for operating a float operated electric switch actuating mechanism, said method comprising providing a float having a notch along said float's outer perimeter, said notch traveling along an assistive rod wherein a spiral rod connected to a frame that limits the displacement of said spiral rod in a vertical dimension while allowing said rod to rotate freely around said rod's central axis in response to said float's up/down movement, with said rod having an adjustable upper and adjustable lower stopper that cause said rod to move up/down in response to said float force on said upper/lower stoppers respectively and wherein a cross beam mechanically connected to said electric switch and to said spiral rod through a rotating mechanical component so that as the float pushes the upper/lower stopper, the resulting cross beam movement activates/deactivates said switch and using the inputs from the above float to selectively refill a fluid volume.

In one aspect, the invention is about a method for operating a float operated electric switch actuating mechanism, said method comprising providing float operated electric switch actuating mechanism comprising: an electric switch, a float, a hollow rod having two rotatable screws along said rod's length, each said screw having a notch along the length of said rod's outer surface, said notch partially exposing said hollow rod's interior for a given length of rod, wherein each said notch having a limit tab with an opening that matches the screw thread, so that rotation of said screw causes the tab to travel along said notch length, one said first tab forming an upper tab, and another said tab forming a lower tab, wherein said rod is connected to a frame that limits the displacement of said spiral rod in a vertical dimension in response to said float's contact with either said upper or a lower tab, wherein a cross beam mechanically connected to said electric switch and to said spiral rod through a rotating mechanical component so that as the float pushes the upper/lower stopper, the resulting cross beam movement activates/deactivates said switch, and using the inputs from the above float to selectively refill a fluid volume.

In one aspect, the invention is about a method for operating a float actuating mechanism comprising: providing a fluid flow actuator, a float having a notch along said float's outer perimeter, said notch traveling along an assistive rod, wherein a spiral rod connected to a frame that limits the displacement of said spiral rod in a vertical dimension while allowing said rod to rotate freely around said rod's central axis in response to said float's up/down movement, with said rod having an adjustable upper and adjustable lower stopper that cause said rod to move up/down in response to said float force on said upper/lower stoppers respectively, wherein a mechanical member mechanically connected to said fluid flow actuator and to said spiral rod through a rotating mechanical component so that as the float pushes the upper/lower stopper, the resulting cross beam movement activates/deactivates said fluid flow actuator, and using the inputs from the above float to selectively refill a fluid volume.

Other features and advantages of the present invention will become apparent upon examining the following detailed description of an embodiment thereof, taken in conjunction with the attached drawings.

Figure 1:
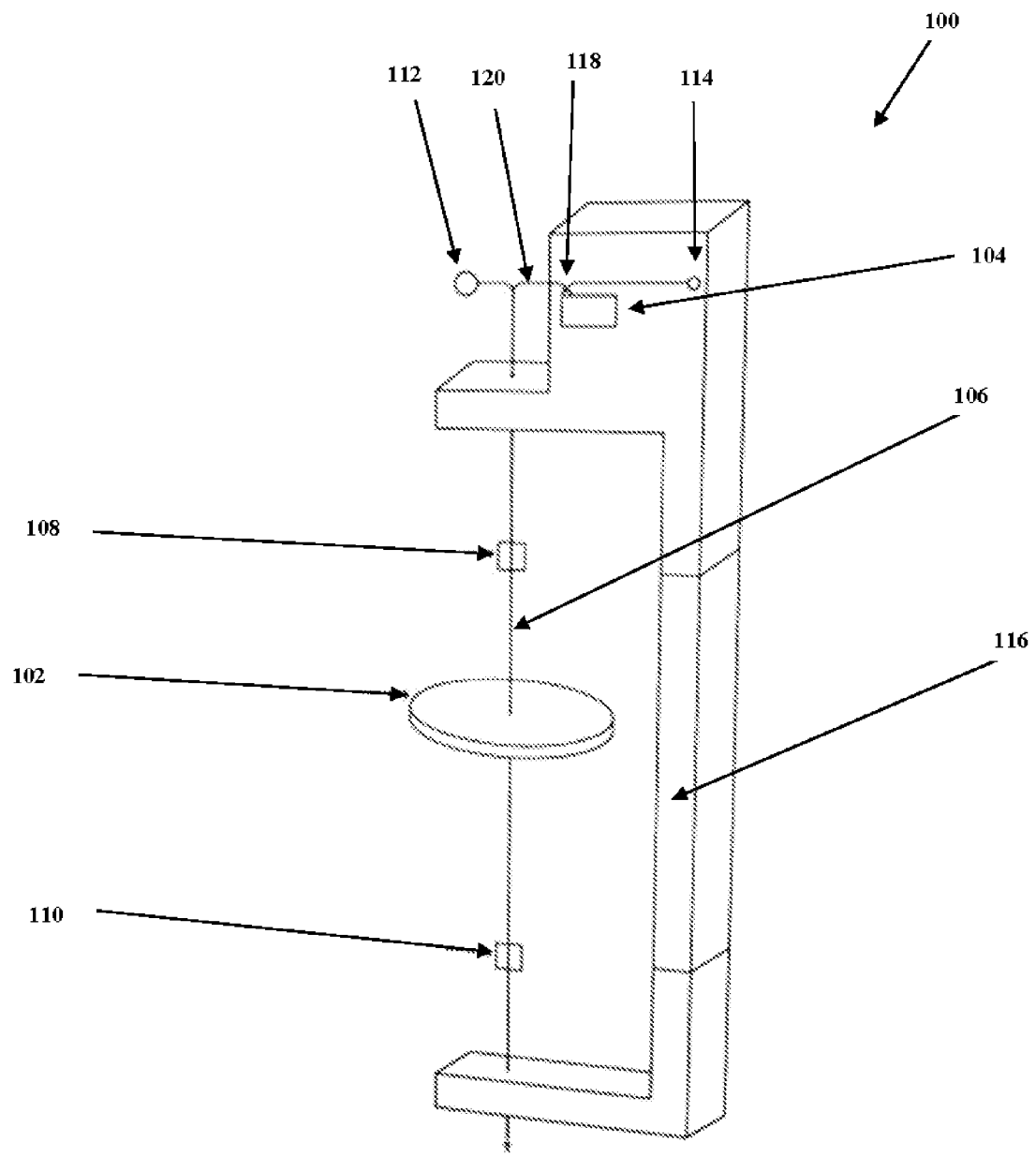
FIG. 1 shows a view of a proposed float assembly, according to an exemplary embodiment of the invention.
Figure 2:
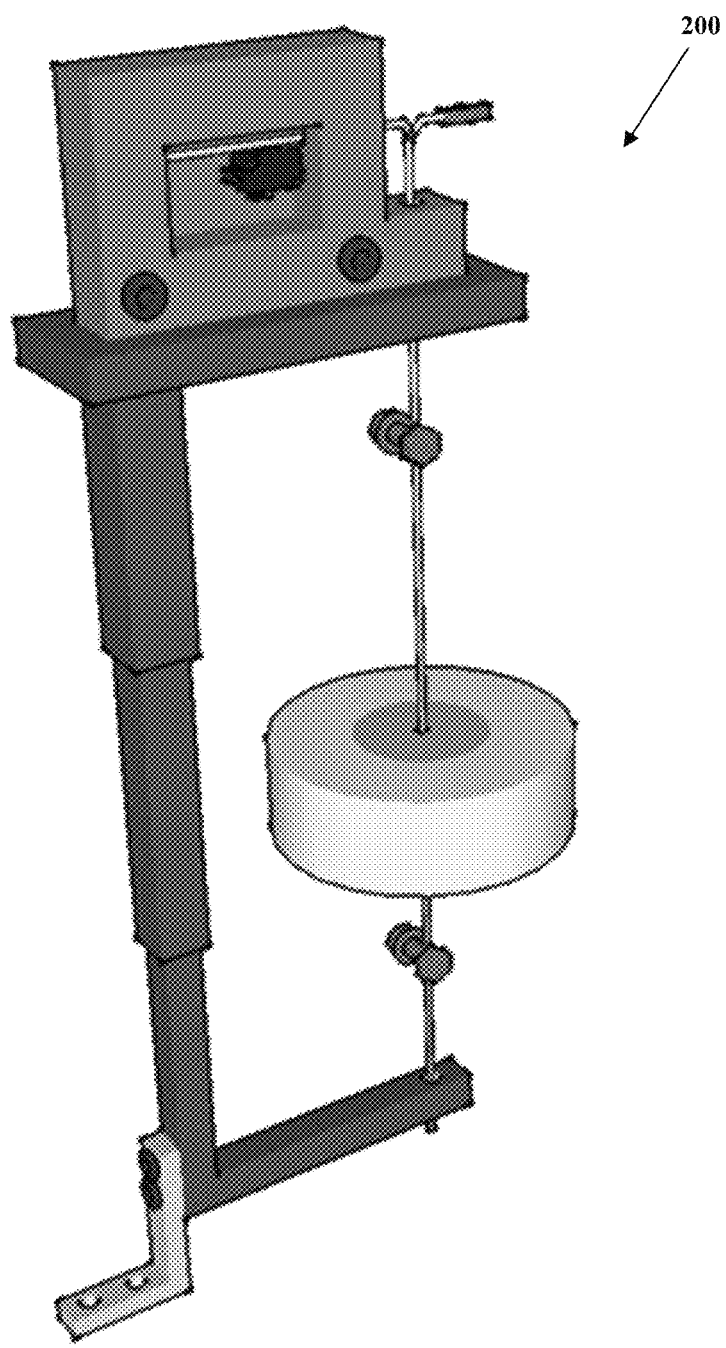
FIG. 2 shows a side view of a proposed float assembly, according to an exemplary embodiment of the invention.
Figure 3:
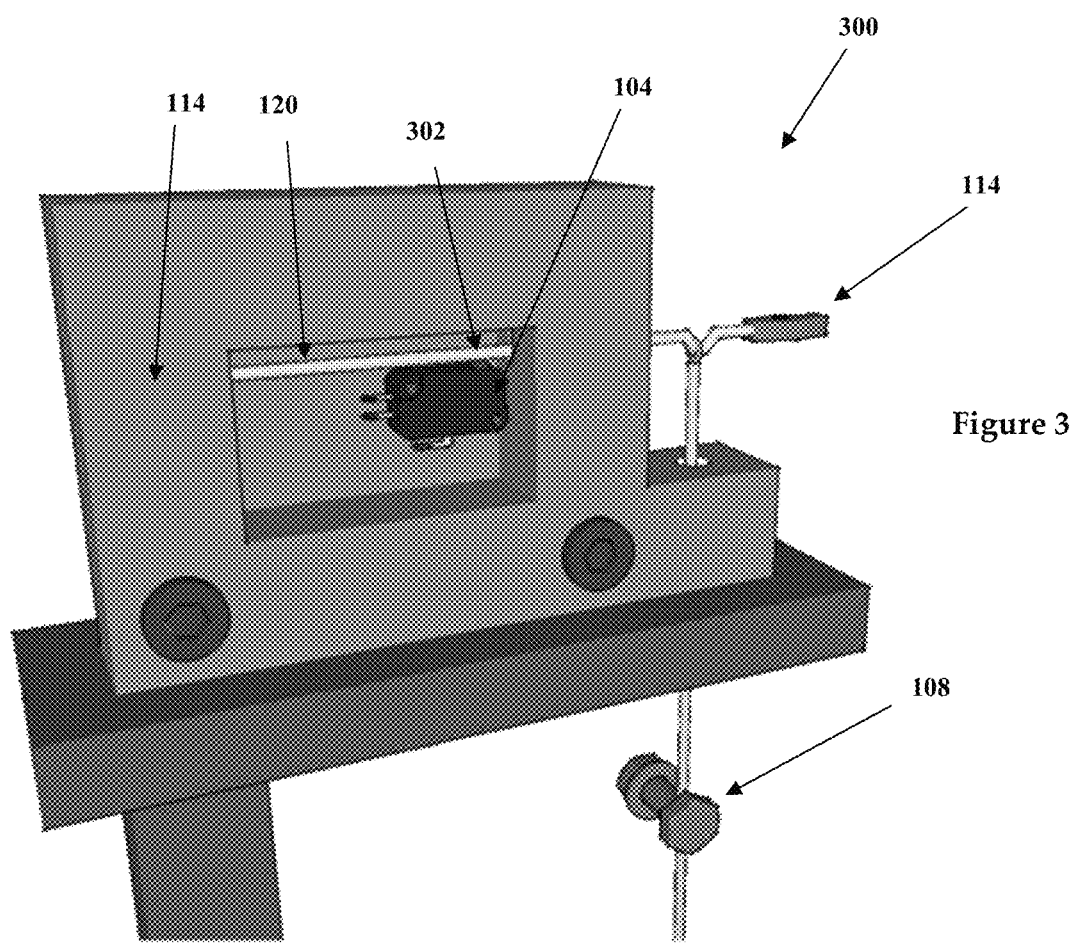
FIG. 3 shows details of the switch assembly, according to an exemplary embodiment of the invention.
Figure 4:
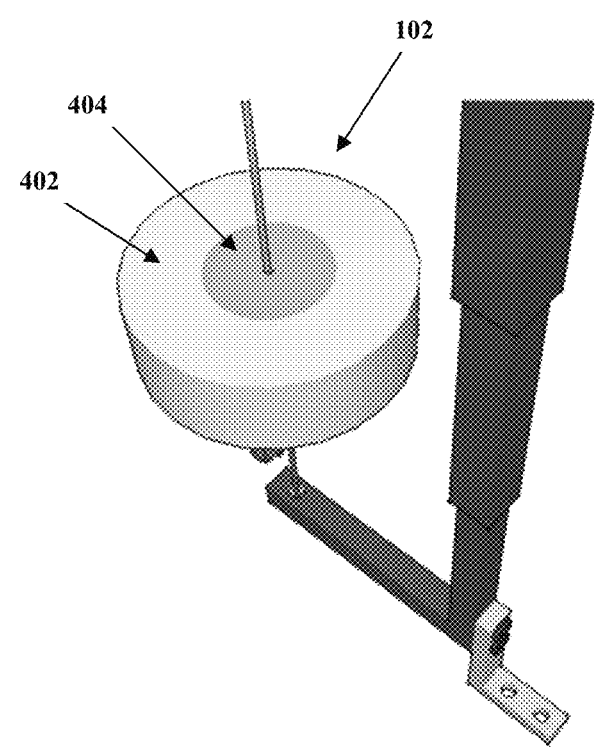
FIG. 4 shows details of the float in the assembly, according to an exemplary embodiment of the invention.
Figure 5:
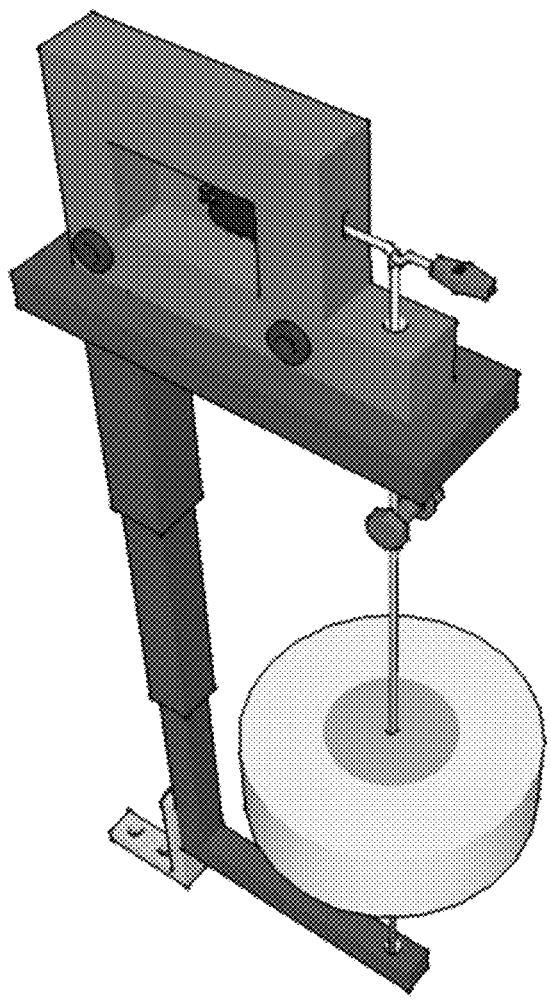
FIG. 5 shows a side top view of a proposed float assembly, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see the embodiment of a float assembly 100 in which the movement of a float 102 attached to a rod 106 operates an electric switch or microswitch 104. In one embodiment, the rod 106 loosely goes through openings at one or both ends of a housing or frame 116 (an exemplary embodiment of a C-frame is shown), which may be attached to the interior of a fluid receptable by one or more brackets.

The movement of the float 102 is based on the flotation of the float within a fluid (preferably a liquid, although the float may float within any fluid), and usually responds to the level of the fluid in which the float 102 resides. The rod's 106 action in response to the up/down movement of the fluid level (as a response to the float 102), causes the electric switch 104 to be actuated/operated, i.e. to transition from one condition (open/close to the complementary one close/open).

The rod 106 movement is caused by the float 102 (which is moving freely along the rod) making contact and pushing against the adjustable upper 108 or lower 110 stoppers. In one embodiment, a single microswitch 104 is used, this has the advantage of eliminating the possibility of dual float positions/status errors. In another embodiment, the axis/shaft may be extended, so that two switches 104 may be activated by the float movement simultaneously and/or sequentially.

The stoppers 108/110 location may be comprised of adjustable fittings such as press fittings, nuts, screws, clips, etc. Adjusting their position allows for short level operation, that is, times when the on/off conditions for the switch are met through small displacements of the float in the water.

The top of the rod 106 has a beam 120 formed by an orthogonal extension on both sides said top, said beam 120 being affixed to said top. A first end or extension of said beam may be fitted with one or more internal or external weight/counterweights 112 combinations, and the opposite extension has a pivot point 114, so that it may pivot the complete beam 120 and apply pressure at the switch point 118 of said beam 120 to activate/deactivate the switch 104 in response to the rod's 106 motion.

In one embodiment, the pivot 114 may be accomplished by attaching the end or near end portion of said beam 120 to the housing or frame 116, so that the motion of the rod 106 causes the pressure at the switch point 118 of said beam 120 to activate/deactivate the switch 104.

In another embodiment, the pivot 114 is simply attached to a weight, so that a 'see-saw' motion (between the weights 112 and that attached to the pivot 114 results in the activation/deactivation of the switch point 118.

The counterweights 112 act as a lever so that the unit may be zeroed and/or the switch be placed/biased in a desired state (open or closed switch) repeatedly. Of course, a common problem with all switches is the 'bouncing' action that may occur when the float 102 exerts pressure on the stopper 108/110 if there is any wave action or fast fluid ripples within the fluid tank. One way to minimize the above, is to have mass to the rod. Of course, too much mass, and the system would always be 'behind' the fluid level.

In one embodiment, adjustable resiliency to the bounce can be accomplished through the 'tilting' of a beam 120 places across the rod top. By then placing variable weights 112 (with pivot point 114 being fixed or another weight) both ends of said beam and then adjusting their relative mass to each other, the beam is biased to go up or down in response to the float hitting the upper or lower stoppers 108/110 in relation to the mass ratio of the weights 112. For example, weight 112 works in lifting the beam from the switch point 118, while pivot 114 is more closely related to keeping it pressed down if affixed, but may be helped if left free with a weight.

In addition, the addition of mass through the counterweights 112 is effective in filtering out float 'bounce' or surface wave action which otherwise could result in rapid on/off switch 104 activation. In this fashion, the counterweight pairing of 112 bias or maintain the switch in one position until the float rises forcing it to the other limit.

It may be placed on the same axis as the buoy. While the float is between the two limits defined by the upper and lower nuts, the system will remain in one state (through the switch action), and once below a level it switches to the other state.

In one embodiment, the float 102 body has internal mass (metal, cement, aggregate, concrete, mortar) placed inside its body, so that the wave action of the fluid's surface is dampened. This, in combination with the mass of the counterweight 112 is effective in filtering out float 'bounce' or surface wave action which otherwise could result in rapid on/off switch 104 activation. The above provides a very precise volume measurement of both the fluid within the tank as well as of the fluid added to the tank.

FIGS. 2-5 show other views (200, 300, 400) of the unit, further detailing the lever or beam 120 contact with the switch actuation point 302. In addition, we see the float 102 comprised of an inner core 404 and the outer core 402.

Figure 6:
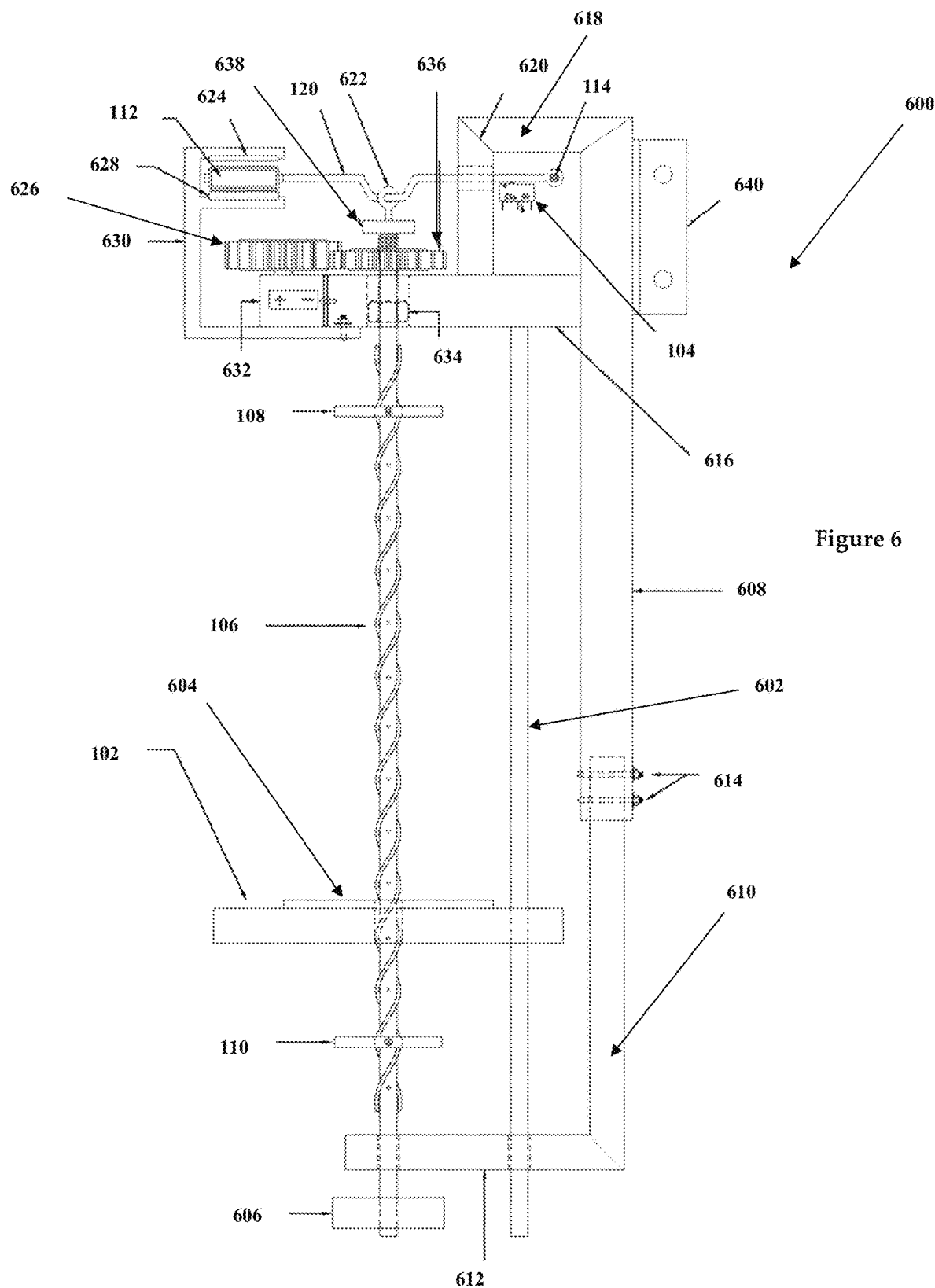
FIG. 6 shows a side view of a proposed float assembly, according to an exemplary embodiment of the invention.
Figure 7:
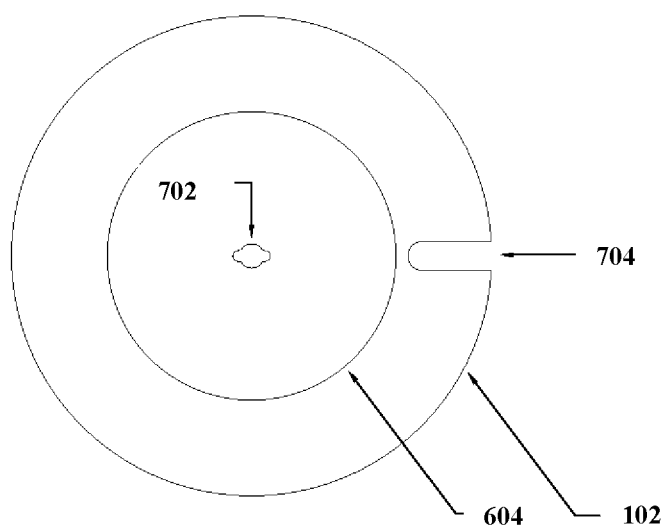
FIG. 7 shows a top view of the float assembly, according to an exemplary embodiment of the invention.
Figure 8:
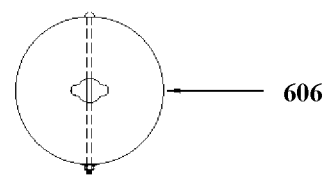
FIG. 8 shows a top view of the adjustable stopper for travel limit, according to an exemplary embodiment of the invention.

Referring to FIGS. 6-8 we see an embodiment of a float assembly 600, where the up/down motion of the float 102 is coupled to a rod 106 that has embedded into it a spiral, threaded or corkscrew structure, which engages to the float 106 central opening 702, with a complementary spiral, threaded or corkscrew opening, so that the motion of the float up/down, provides a torque which rotates the rod 106 around a sliding nut 634 on top and the opening in the bottom bracket 612, and a rotating mechanical component 638 (such as a ball bearing or sliding bracket). The assembly allows the rod 106 to both stay centered while rotating as well as move up/down when the float 102 hits the upper/lower limits 108/110. Note that the torque would act against the float, but since the float has a notch 704 along it's perimeter or outer periphery, which is indented into the frame assistive rod 602, the turning as the float 102 moves is accomplished by the rod 106.

The ball bearing/sliding bracket 638 forms the top of the assembly, which is coupled at a point 622 to the beam 120. In one embodiment, the beam ends at said point 622, so that a straightforward lever action against the pivot point 114 causes the switch 104 is activated/deactivated. In another embodiment, a counterweight 112 is used as described earlier. In another embodiment, the counterweight 112 is comprised in all or parts of a ferrous metal, so that the addition of a top, bottom or top/bottom set of permanent magnets 624/628 causes any significant motion to activate/deactivate the switch 104. In an alternate embodiment, these 624/628 may be electromagnets.

In one embodiment, the float 102 has an optional additional weight 604 placed on it to counteract excessive flotation. This may be a good solution for tanks having fluids with too much surface action, where the float is calibrated to be a distance 'X' below the surface, eliminating wave action into the reading of the fluid level.

Travel of the float 102 is limited by the upper/lower 108/110 stoppers or travel tabs, which are designed to be adjusted to be placed at the desired limit of travel for the float 102 within the rod 106. For fluids where the weight of the rod 106 assembly requires it, an assistive float 606 may be used to zero out the weight of the rod.

The complete float assembly structure 600 is comprised of a mounting frame (preferably comprised of metal, plastic, glass, wood, carbon composite or any suitable combinations) formed into a vertical column 608 (which may be extendable through one or more extensions 610) having a lower beam 612 which holds the lower ends of the rod 106 and assistive rod 602. The length is fixed based on one or more set screws 614. On top, we have an upper beam 616, from which upper portion of the rod 106 and assistive rods 602 are held, as well as other portions of the assembly. These may include a top beam 618 and top column 620, as well as additional upper support materials like a top bracket 630. The complete assembly is attached to the tank wall or lid via a mounting bracket 640.

The rod 106 rotation against the float 102 movement action on the spiral causes the rotation of a first gear 636 attached to the rod 102 (note the first gear 636 also moves up/down with the rod 106, but this is accounted in the larger height of the second gear 626 to which it is geared). The rotation of these gears activates a rotational measurement component 632 (such as a encoder, potentiometer, rheostat, rotation counter and/or multi-output switch or similar devices) which can then be used to ascertain the height of the float within the rod, which may be provide an indication of the height of the float within the fluid (hence of the fluid amount within the tank).

Figure 9:
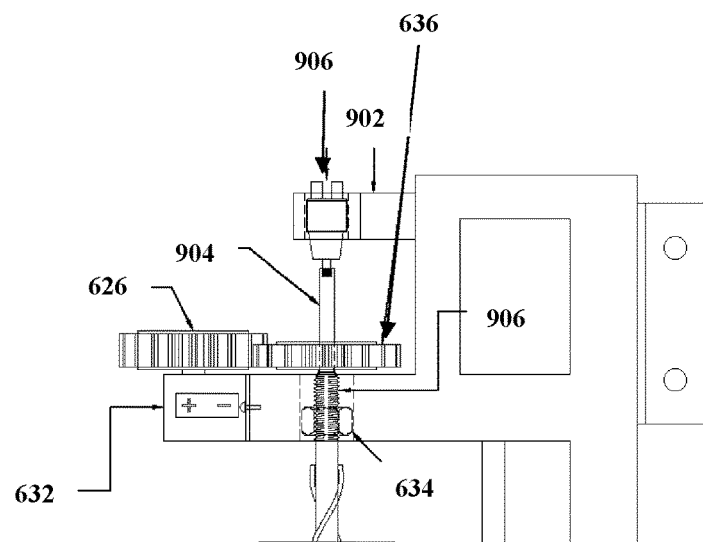
FIG. 9 shows a side view of a proposed float assembly, according to an exemplary embodiment of the invention.
Figure 9:
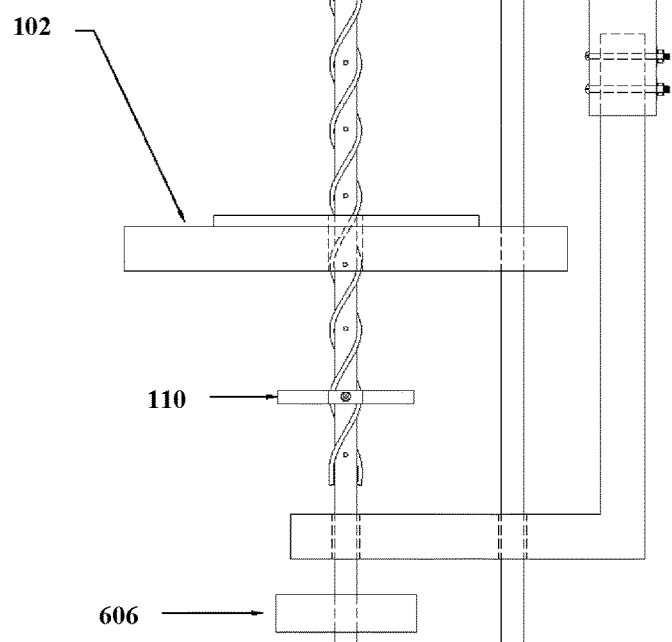
Figure 10:
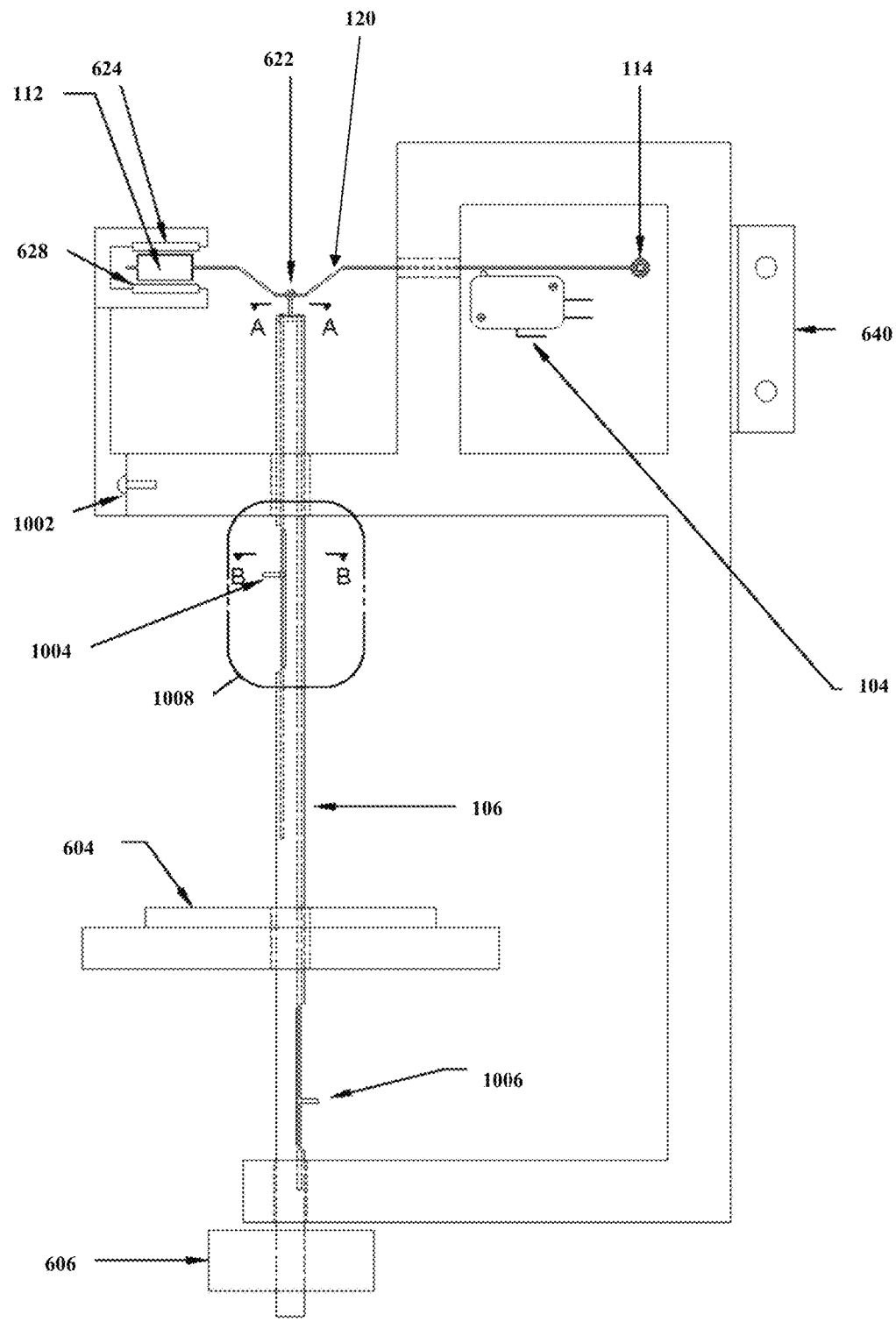
FIG. 10 shows a side view of a proposed float assembly, according to an exemplary embodiment of the invention.
Figure 11:
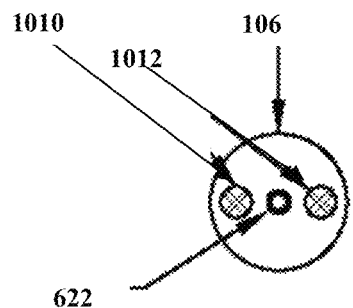
FIG. 11 shows a top view of cross section A-A on FIG. 10, according to an exemplary embodiment of the invention.
Figure 12:
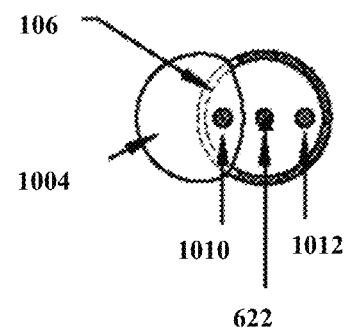
FIG. 12 shows a top view of cross section B-B on FIG. 10, according to an exemplary embodiment of the invention.
Figure 13:
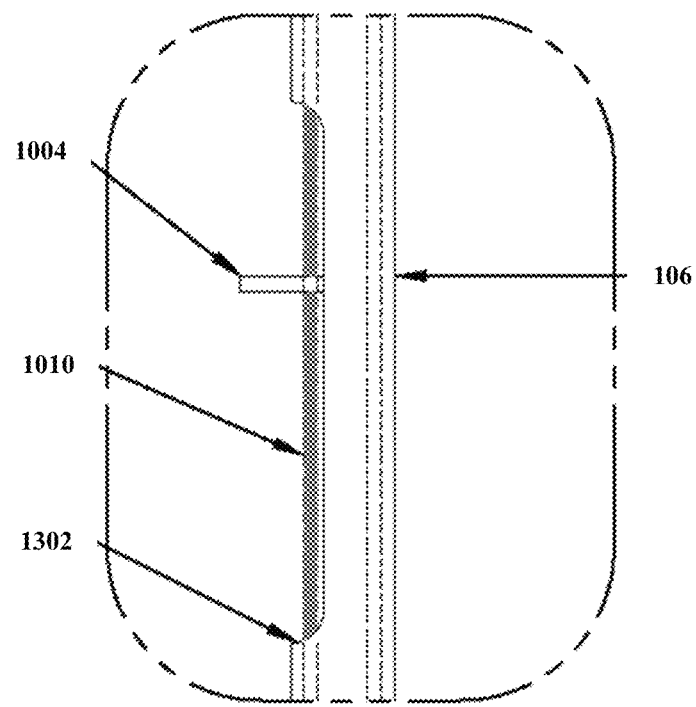
FIG. 13 shows details of section C-C on FIG. 10, according to an exemplary embodiment of the invention.
Figure 14:
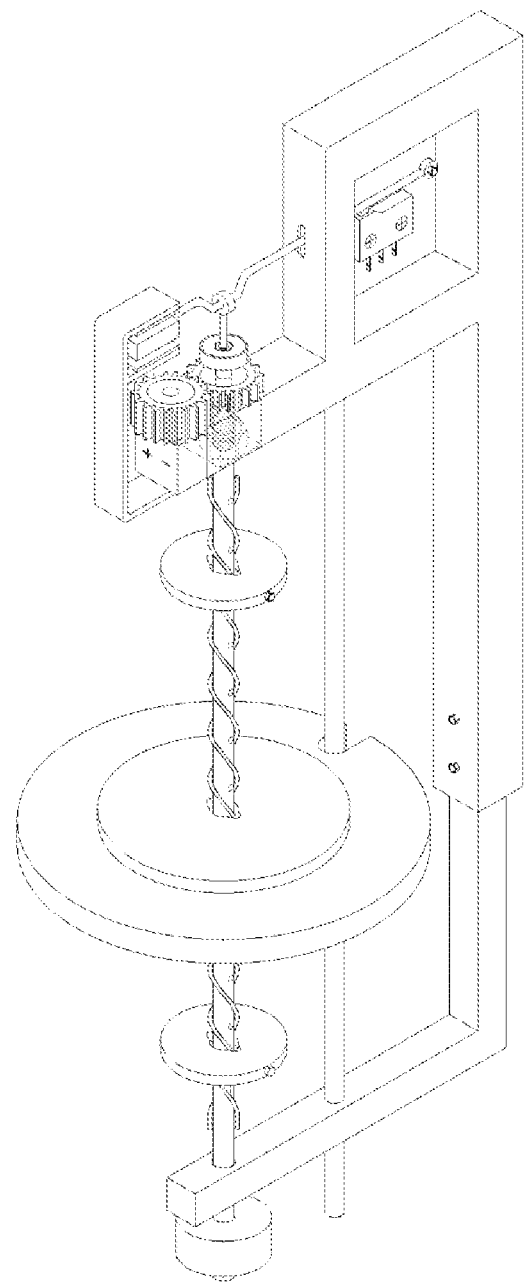
FIG. 14 shows an isometric view of a proposed float assembly, according to an exemplary embodiment of the invention.
Figure 15:
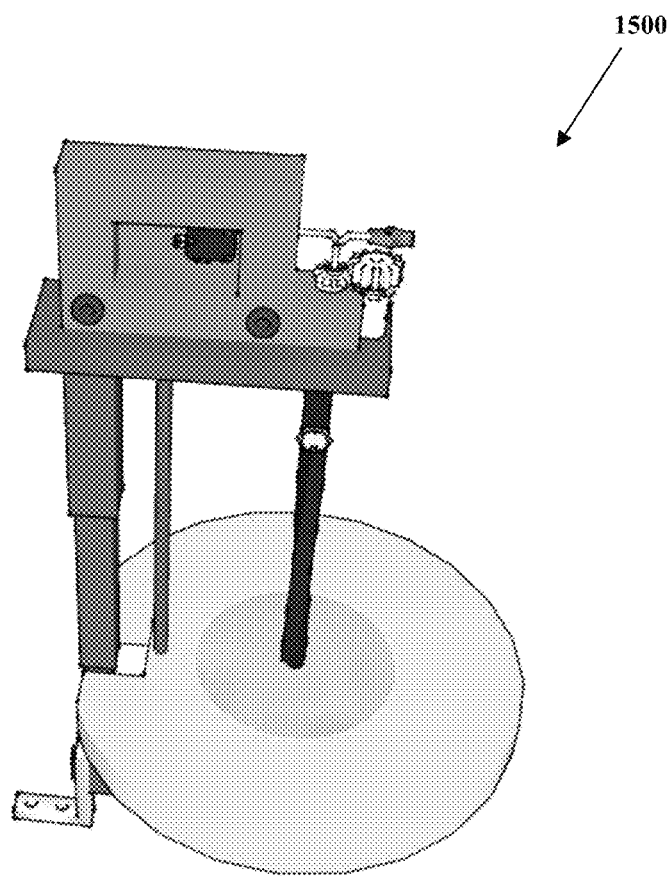
FIG. 15 shows an isometric view of a proposed float assembly, according to an exemplary embodiment of the invention.
Figure 16:
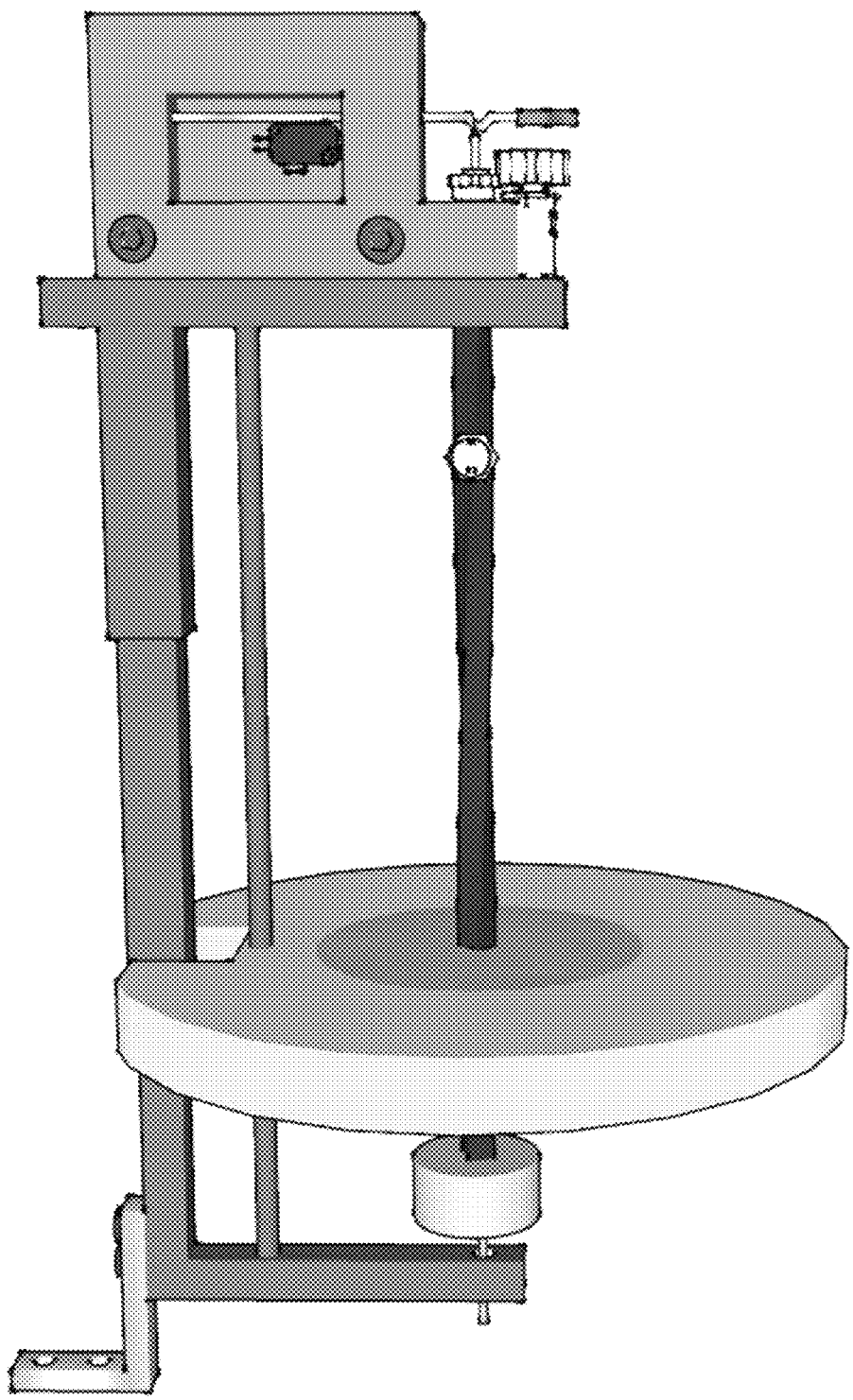
FIG. 16 shows a side view of a proposed float assembly, according to an exemplary embodiment of the invention.
Figure 17:
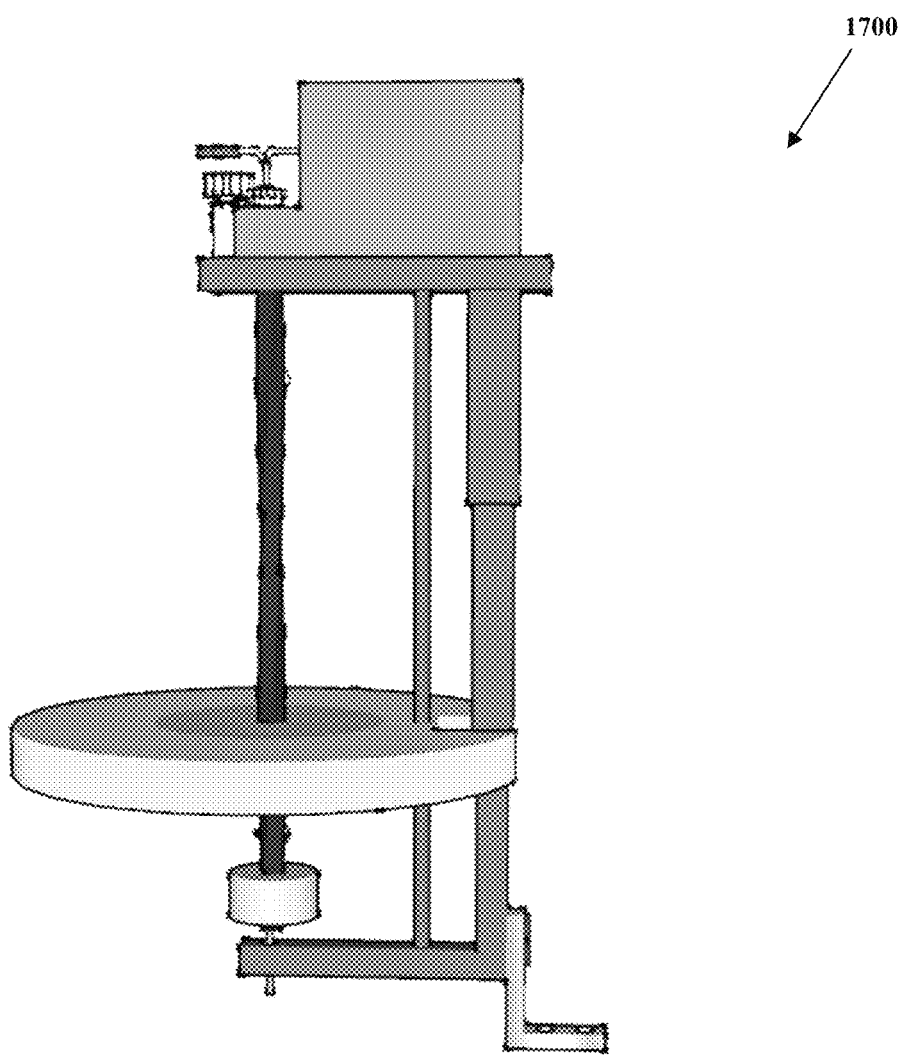
FIG. 17 shows a side view of a proposed float assembly, according to an exemplary embodiment of the invention.

In another embodiment FIG. 9, a similar rotational rod 106 is used, with the addition a fluid flow actuator 906 connected to a beam 902 extending off the top column 620 (or other suitable upper support member). In one embodiment, the fluid flow actuator 906 is an electrical switch that is activated/deactivated by the rod central member 904, whose overall height may be fined tuned by the turning of the rod 106 against the sliding nut 634, so that as the float 102 hits the upper/lower stoppers 108/110, and the position of the float 102 may be ascertain by the number of rotations as measured by the gear/gear/rotational measurement component 626/636/632 couplings.

In an even simpler embodiment, the fluid flow actuator 906 is a simple mechanical fluid valve, which is opened by the rod 106 downward force (or lacked of pressure) and closes when the float 102 hits the upper stopper 108 In both cases, the overall position of the rod 106 may be adjusted by moving the sliding nut.

In another embodiment (FIGS. 10-13), the float assembly 1000 is comprised of a central hollow rod 106 along which the float 102 slides up/down. The central rod 106 is comprised of a tubular hollow housing, having an upper member 622 which is mechanically coupled to the beam 120, so that the up/down motion created by the float hitting the limit tabs 1004/1006 causes the switch 114 activation as described before.

Within said housing there are two or more endless rotatable screws 1010/1012 traveling along said rod's 106 length. For each said screw 1010/1012, there is a notch or adjustment center 1302 along the length of said rod 106, along which said tab 1004/1006 (having an opening with a thread that matches the screw 1010/1012) so that rotation of said screw causes the tab position to be adjusted up/down.

The actual limit tabs 1004/1006 height may be adjusted by rotating the screw 1010/1012 to which it is connected from the top (outside the tank and/or the fluid), in this fashion allowing for the tab (view 1008, FIG. 13) to be raised/lowered. In one embodiment, there is an adjustment segment 1302 for each tab 1004/1006, limiting how far they travel (and making the rod 106 stronger). In another embodiment, these segments (for both the upper 1004 and lower 1006 tabs) extend all along the rod 106.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A float operated electric switch actuating mechanism comprising:
   an electric switch;
   a float having a notch along said float's outer perimeter, said notch traveling along an assistive rod;
   a spiral rod connected to a frame that limits the displacement of said spiral rod in a vertical dimension while allowing said spiral rod to rotate freely around said spiral rod's central axis in response to said float's up/down movement, with said spiral rod having an adjustable upper and adjustable lower stopper that cause said spiral rod to move up/down in response to said float force on said upper/lower stoppers respectively; and
   a cross beam mechanically connected to said electric switch and to said spiral rod through a rotating mechanical component so that as the float pushes the upper/lower stopper, the resulting cross beam movement activates/deactivates said switch.

2. The mechanism of claim 1 wherein:
   one or more rotational measurement components mechanically coupled to said spiral rod so as to measure said spiral rod's rotation, while allowing said spiral rod's up/down movement in response to said float contact with said upper/lower stoppers.

3. The mechanism of claim 2 wherein:
   said rotational measurement component is comprised by one of:
   an encoder, potentiometer, rheostat and/or rotation counter; and
   said rotational components mechanical coupling is comprised of two gears, one taller than the other by the distance by which said spiral rod moves up/down in response to said float contact with said upper/lower stoppers.

4. The mechanism of claim 3 further comprising:
   an assistive float.

5. The mechanism of claim 4 wherein:
   said cross beam's pivot point is mechanically linked to said frame at a first end, said cross beam makes contact with said switch at a point between said first end and said mechanical connection to said spiral rod and said cross beam further extends to form said beam's distal end.

6. The mechanism of claim 5 wherein:
   said cross beam's distal end has a counterweight.

7. The mechanism of claim 6 wherein:
   said counterweight is comprised of all or parts of a ferrous material; and
   said counterweight is sandwiched within a gap formed by two permanent magnets.

8. A float operated electric switch actuating mechanism comprising:
   an electric switch;
   a float;
   a hollow rod having two rotatable screws along said hollow rod's length, each said screw having a notch along the length of said hollow rod's outer surface, said notch partially exposing said hollow rod's interior for a given length of hollow rod;
   each said notch having a limit tab with an opening that matches the screw thread, so that rotation of said screw causes the tab to travel along said notch length, one said first tab forming an upper tab, and another said tab forming a lower tab;
   wherein said hollow rod is connected to a frame that limits the displacement of said hollow rod in a vertical dimension in response to said float's contact with either said upper or a lower tab;
   a cross beam mechanically connected to said electric switch and to said hollow rod through a rotating mechanical component so that as the float pushes the upper/lower stopper, the resulting cross beam movement activates/deactivates said switch.

9. The mechanism of claim 8 further comprising:
   an assistive float.

10. The mechanism of claim 9 wherein:
    said cross beam's pivot point is mechanically linked to said frame at a first end, said cross beam makes contact with said switch at a point between said first end and said mechanical connection to said hollow rod and said cross beam further extends to form said beam's distal end.

11. The mechanism of claim 10 wherein:
    said cross beam's distal end has a counterweight.

12. The mechanism of claim 11 wherein:
    said counterweight is comprised of all or parts of a ferrous material; and
    said counterweight is sandwiched within a gap formed by two permanent magnets.

13. A float actuating mechanism comprising:
    a fluid flow actuator;
    a float having a notch along said float's outer perimeter, said notch traveling along an assistive rod;
    a spiral rod connected to a frame that limits the displacement of said spiral rod in a vertical dimension while allowing said spiral rod to rotate freely around said spiral rod's central axis in response to said float's up/down movement, with said spiral rod having an adjustable upper and adjustable lower stopper that cause said spiral rod to move up/down in response to said float force on said upper/lower stoppers respectively; and
    a mechanical member mechanically connected to said fluid flow actuator and to said spiral rod through a rotating mechanical component so that as the float pushes the upper/lower stopper, the resulting cross beam movement activates/deactivates said fluid flow actuator.

14. The mechanism of claim 13 wherein:
    one or more rotational measurement components mechanically coupled to said spiral rod so as to measure said spiral rod's rotation, while allowing said spiral rod's up/down movement in response to said float contact with said upper/lower stoppers.

15. The mechanism of claim 14 wherein:
    said rotational measurement component is comprised of at least one of:

an encoder, potentiometer, rheostat and/or rotation counter;

said rotational components mechanical coupling is comprised of two gears, one taller than the other by the distance by which said spiral rod moves up/down in response to said float contact with said upper/lower stoppers; and said fluid flow actuator is comprised of at least one of:

fluid valve and/or electrical switch.

16. The mechanism of claim 15 further comprising:

an assistive float.

* * * * *